May 21, 1957    J. E. BARBIER ET AL    2,793,041
MACHINE TOOL FIXTURE

Filed Jan. 26, 1955    3 Sheets-Sheet 1

Inventors
John E. Barbier
Charles A. Ginter

Wm O. Weser Atty.

May 21, 1957  J. E. BARBIER ET AL  2,793,041
MACHINE TOOL FIXTURE

Filed Jan. 26, 1955  3 Sheets-Sheet 2

Inventors
John E. Barbier
Charles A. Ginter

Wm O Mosser Atty.

May 21, 1957 J. E. BARBIER ET AL 2,793,041
MACHINE TOOL FIXTURE
Filed Jan. 26, 1955 3 Sheets-Sheet 3

INVENTORS
JOHN E. BARBIER
and CHARLES A. GONTER
BY
Sughrue & Rothwell
ATTORNEYS

United States Patent Office 2,793,041
Patented May 21, 1957

2,793,041

MACHINE TOOL FIXTURE

John E. Barbier, Springfield, and Charles A. Ginter, Brownsville, Vt., assignors to Jones & Lamson Machine Company, a corporation of Vermont Application January 26, 1955, Serial No. 484,288

3 Claims. (Cl. 279—6)

Our invention relates to machine tools and relates more particularly to novel means for adjusting the alignment between two axes.

In many applications, it is often necessary to bring two axes into accurate alignment. Misalignment of tools with work spindles, for example, may be caused by wear of machine tool slides or initial inaccuracies in tool holders, fixtures, or the like. Such misalignment is one of the causes of tool breakage or inaccurate work. On the other hand, a deliberate and measured amount of misalignment is required in some instances.

It is accordingly a major object of our invention to provide a device for positioning the effective center point of a circular aperture.

It is a further object of our invention to provide simple and novel means for compensating for a measured amount of misalignment between two axes.

It is another object of our invention to provide compound eccentric means for adjusting the effective center point of a circular aperture, said means being provided with scales whereby the exact amount and direction of adjustment is readily determined.

A more complete understanding of our invention may be had from the following specification and the accompanying drawings in which like reference characters refer to like parts, and in which—

Figure 1:
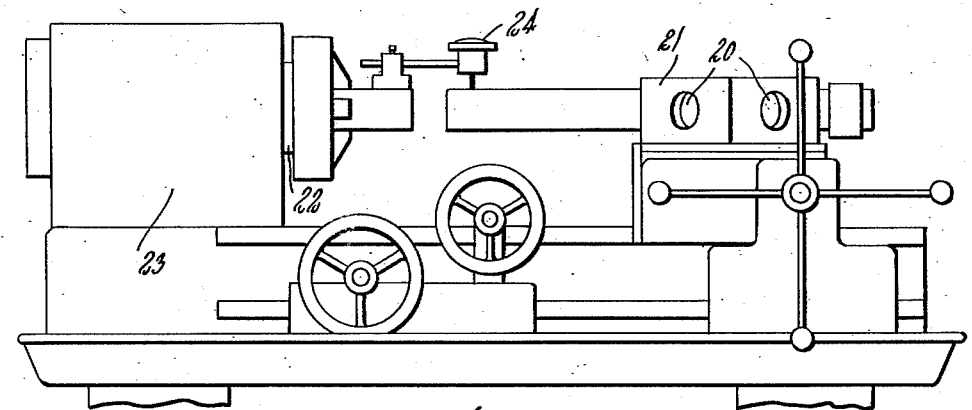
Figure 1 is a view in elevation of a machine tool illustrating one possible setting of the invention.
Figure 4:
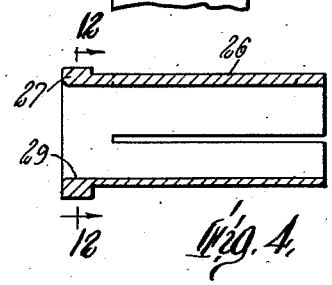
Figure 4 is a sectional view on the section lines 4—4 of Figure 2.
Figure 5:
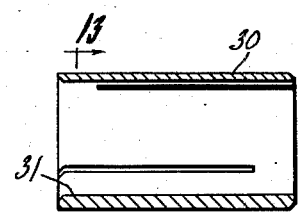
Figure 5 is a sectional view on the section lines 5—5 of Figure 3.
Figure 12:
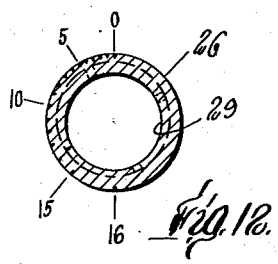
Figure 13:
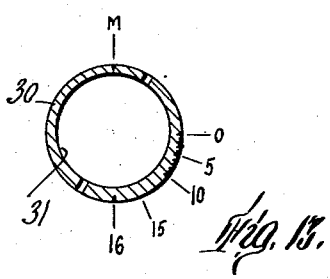
Figure 14:
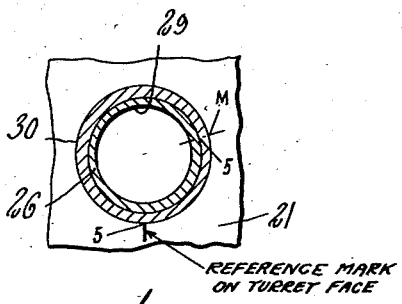
Figure 15:
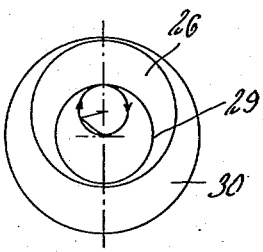
Figure 16:
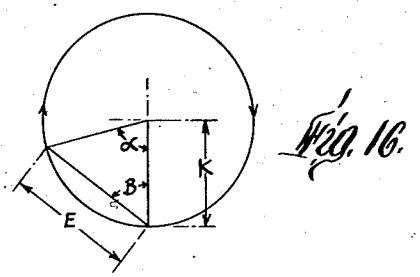
Figure 17:
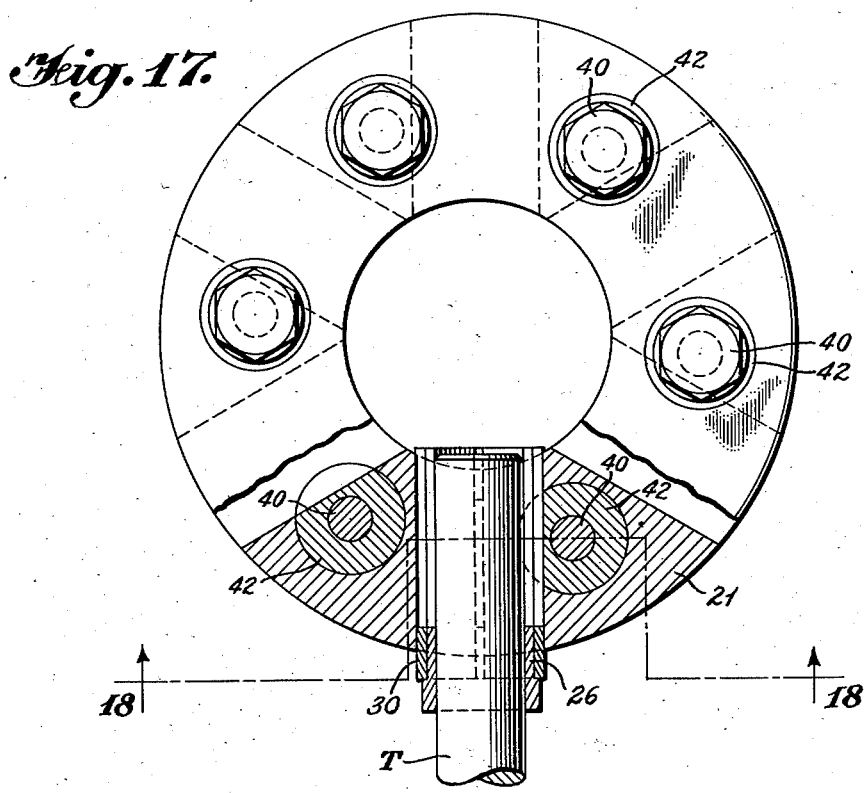
Figure 18:
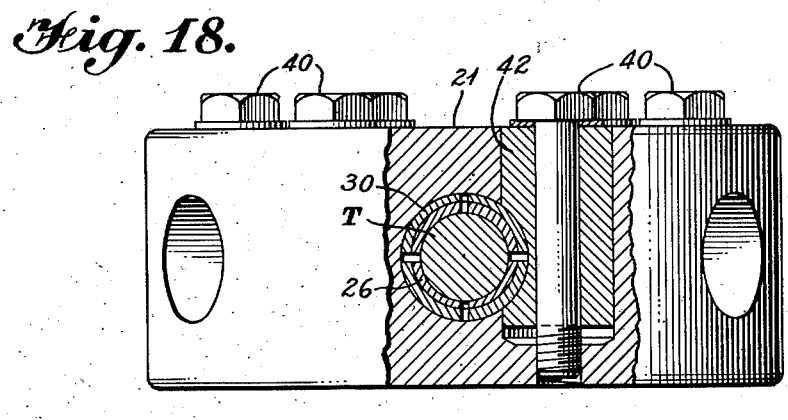

Figures 12 and 13 are individual end views of the members taken along the section lines 12—12 and 13—13 of Figures 4 and 5 respectively;

Figure 14 is a view in section of the assembled compound bushing illustrating its use in the machine of Figure 1;

Figure 15 is a schematic diagram illustrating the mode of operation of our invention;

Figure 16 is a detailed schematic diagram of a portion of Figure 15, enlarged, to illustrate the mathematical principles involved in the operation of our invention;

Figure 17 is a top plan view, partially in section, showing the tool-holder turret 21, the compound bushing of the invention, a tool or test bar T, and the clamping means for the test bar and compound bushing; and Figure 18 is a side view, partially in section, taken along lines 18—18 of Figure 17, further showing the means for clamping the bushing within the turret and the tool within the bushing.

Referring now more particularly to the drawings, a turret lathe is shown in Figure 1, which may be of the general type shown in U. S. Patent 2,562,266 issued July 31, 1951, to Ralph M. Gamble. When such a machine is in perfect condition the axes of the holes 20 in the turret 21 are each in exact alignment with the center of rotation of the spindle 22 in the headstock 23. This ideal condition would be shown, with a test bar mounted in the turret, by an indicator 24 rotated by the spindle. If the spindle axis is in correct alignment with the axis of the hole 20, the indicator will hold its set value without variation through 360 degrees of rotation. Twice the value of any misalignment of these two axes will be indicated in one complete rotation of the spindle. If a cutting tool is to be presented to a work piece in its proper relationship, any such misalignment condition must be corrected.

Figure 2:
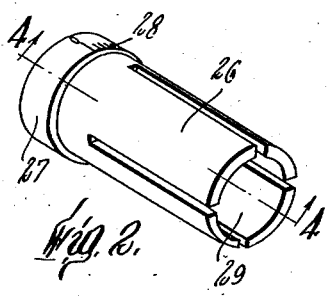
Figures 2 and 3 are perspective views of the inner and outer members, respectively, comprising the compound bushing.
Figure 3:
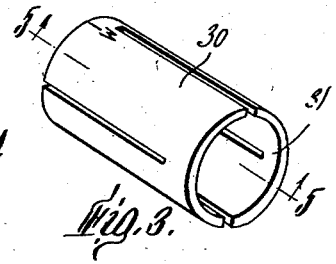
Figure 6:
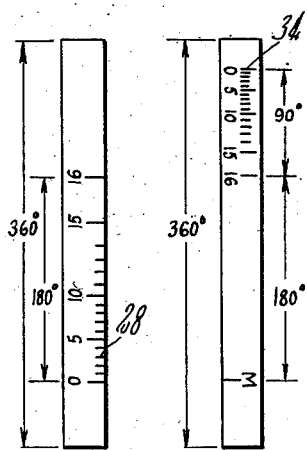
Figures 6 and 7 are developed views of the scales on the inner and outer members, respectively.

Our compound eccentric bushing is made up of two parts, as shown in Figures 2 and 3. The inner members, Figure 2, comprises a sleeve 26 having a head portion 27 integral therewith. On the head 27, and parallel to the axis of the sleeve, are reference lines forming a scale 28 shown in developed form in Figure 6. The scale 28 runs, in this case, from 0 to 16 and occupies 180 degrees round the head portion 27. The units on the scale refer, in this case, to thousandths of one inch and are arranged in a harmonic series as will hereinafter be explained. We find it desirable to provide a plurality of slots in the body portion of the sleeve, as shown in Figure 2, to afford a degree of radial compliance useful in clamping the bushing while in operation.

The hole 29 in the sleeve 26 is eccentric to the outside diameter of the sleeve as shown best in Figure 12, and greatly exaggerated in Figure 15. In this particular case, the center line of the hole 29 is displaced from the center line of the outside surface of the sleeve 26 by eight thousandths of one inch.

The scale mark "0" is placed at the point of maximum wall thickness, while the scale mark "16" is placed at the point of minimum wall thickness 180 degrees from point "0."

Figure 7:
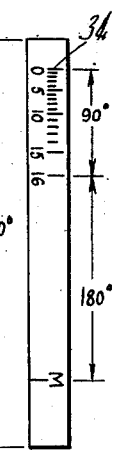
Figure 8:
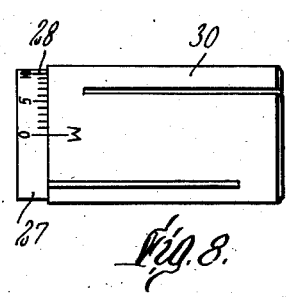
Figure 8 is a view of the members assembled, at concentric or zero setting.
Figure 9:
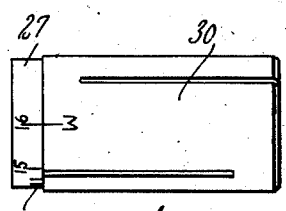
Figure 9 is a view of the members assembled, at maximum eccentric adjustment.

The outer sleeve 30, Figures 3 and 13, has a hole 31 therein, the center line of which is displaced from the center line of the outside surface by eight thousandths of one inch. At the point of minimum wall thickness a reference mark "M" is provided. 180 degrees from the mark "M," scale number "16" appears, at the point of maximum wall thickness. The scale on outer sleeve 30 runs from 0 to 16, and includes an arc of 90 degrees, as shown in Figures 7 and 13. The inside diameter of sleeve 30 and the outside diameter of sleeve 26 are such that the two components nest together with a close sliding fit, as shown in Figures 8 and 9. The sleeve 30 may be slotted in a manner similar to the sleeve 26 if desired to provide a degree of radial compliance. Thus the assembled bushing can be clamped solidly in the turret 21 and it will securely hold the shank of a tool inserted in the hole 29. One mechanism for accomplishing this is shown in Figures 17 and 18. Referring to these figures, the assembled bushing, comprising sleeves 26 and 30, is assembled in a hole 20 in the turret 21. The outside diameter of the eccentric bushing fits the hole in the turret closely but there is enough radial compliance to provide a firm grip on the shank of a tool or test bar T inserted within the bushing. A clamping screw 40 extends through a clamping sleeve 42 and is threaded into the turret 21. After the compound bushing and tool have been assembled, the clamping screw 40 is tightened, thereby causing the clamping sleeve to bind the resilient eccentric bushing and the tool held therein against the turret 21.

Figure 10:
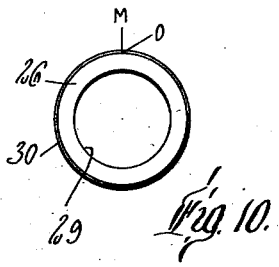
Figures 10 and 11 are end views of the assembled members corresponding to Figures 8 and 9.
Figure 11:
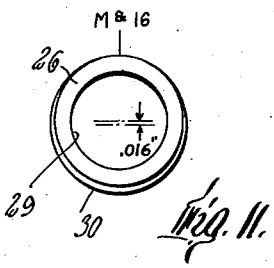

When assembled, with the mark "M" aligned with "0" of scale 28, as shown in Figures 8 and 10, the eccentricities of the two members cancel, and a concentric bushing is the effective, composite result. This can also be seen in Figure 15, in which the hole 29 is now concentric with the outside diameter of the sleeve member 30. As the inner member 26 is rotated relative to the outer member 30, the center of hole 29 describes a circular path as shown in Figure 15. The point of maximum effective composite eccentricity is reached when the mark "M" on sleeve 30 is aligned with "16" on the scale 28, as shown in Figures 9 and 11. In this position the total eccentricities of both sleeves 26 and 30 are additive, and the assembled bushing effects a maximum displacement of the center of hole 29 relative to the outside surface of sleeve 30.

Between these extremes of concentricity and maximum eccentricity any setting can be made, varying in the particular embodiment described herein from 0 to 16 thousandths of one inch.

The direction of the displacement due to the composite eccentricity of the assembled bushing is given by the scale 34. The use of both scales 28 and 34 in a practical application will now be explained.

Suppose a test run on the machine illustrated in Figure 1 shows a total runout on the indicator 24 of .010" in one complete revolution of the spindle. Suppose also that the highest reading occurs when the indicator is 180 degrees from the position shown in Figure 1. The operator then makes a reference mark on the turret face, Figure 14. This denotes that the axis of the hole 20 in the turret 21 is lower than the spindle axis by one-half of the total reading, or .005 of one inch. This is a not uncommon condition resulting from wear of the slides on which the turret assembly moves.

To make the correction with our invention and bring the machine into alignment again, it is merely necessary to turn sleeve 26 within sleeve 30 until the "5" mark on scale 28 registers with the "M" mark on scale 34. The assembled bushing is then placed in the turret hole 20, with the "5" mark on scale 34 placed at the point of maximum indicator reading, all as shown in Figure 14. This will bring the effective axis of the hole 20 into exact alignment with the spindle. Thereafter, a tool held in the assembled bushing will be presented in the desired relationship to a workpiece being rotated by the machine spindle 22.

It will be seen that in each case the amount of correction is given by the relative angular position of sleeve 26 in relation to sleeve 30, while the direction of correction is given by the appropriate number on the scale 34.

In some instances it may be required to produce a deliberate measured misalignment. For example, if a center was to be mounted in the turret 21 and extremely accurate tapers were to be turned, our invention would be used to set the center over by the desired amount. This can be done by directly setting the scales as heretofore explained.

We have described herein a particular example of our invention for purposes of explanation. The particular scales illustrated may be altered to read in any units which may be required and the amount of eccentricity available for purposes of adjustment is, of course, a matter of individual design.

From the schematic diagrams, Figures 15 and 16, it will be aparent how any given set of scales is derived. Figure 15 shows the circular path taken by the axis of the hole 29 as the device is adjusted from minimum to maximum eccentricity. In Figure 16, the elements may be identified as follows:

Let
$K$=eccentricity per member
$E$=composite eccentricity
$\alpha$=angle of relative rotation of members
$B$=angle at which the effective center is displaced To solve for $\alpha$ and $B$ for a given $E$:

$$\sin\frac{\alpha}{2}=\frac{E}{2K}$$

where $$0 \leq E \leq 2K$$

$$B = 90° - \frac{\alpha°}{2}$$

or, in radians, $$B = \frac{\pi}{2} - \frac{\alpha}{2}$$

The composite eccentricity provides the user with a single bushing in effect, having a varying amount of eccentricity to meet any of the usual alignment or adjustment problems in a wide variety of machine tool applications. Critical center distances of shafts may be altered by known amounts in desired directions with the novel bushing device herein described. It is apparent, therefore, that many modifications and adaptations of our invention will occur to persons skilled in the various arts to which it applies, and we intend to be limited solely by the scope and spirit of the claims appended hereto.

We claim:

1. A compound bushing device for relocating the center of a circular aperture comprising: a first sleeve member adapted to fit in said aperture, said sleeve having an eccentricity between its inside and outside diameters; a second sleeve member slidably mounted within said first sleeve, said second sleeve also having an eccentricity between its inside and outside diameters; a measuring scale calibrated in measuring units on one of said members indicating the composite eccentricity of the eccentric sleeve members; and another measuring scale calibrated in measuring units on one of said members indicating the direction of composite eccentricity with respect to said aperture.

2. A device as defined by claim 1 wherein said sleeve member other than said sleeve member carrying said measuring scale indicating the composite eccentricity, carries a fiducial mark which cooperates with said composite eccentricity measuring scale.

3. A composite eccentric bushing device for adjusting the effective center of a circular aperture comprising: a first sleeve member adapted to be slidably mounted in said aperture, said sleeve having an eccentricity between its inside and outside diameter; a second sleeve member slidably mounted within said first sleeve member, said second sleeve also having an eccentricity between its inside and outside diameters; a measuring scale calibrated in practical measuring units on said second sleeve member for indicating the relative angular position of said second sleeve with respect to said first sleeve in terms of the composite eccentricity between the outside diameter of said first sleeve and the inside diameter of said second sleeve; and another inter-related measuring scale calibrated in the same practical measuring units on said first sleeve indicating the direction of composite eccentricity with respect to said aperture.

References Cited in the file of this patent

UNITED STATES PATENTS

| | | |
|---|---|---|
| 963,559 | Hines | July 5, 1910 |
| 1,157,817 | Steudner | Oct. 26, 1915 |
| 1,703,549 | Sergeeff | Feb. 26, 1929 |